(12) United States Patent
Bas Sanchez et al.

(10) Patent No.: US 12,075,253 B2
(45) Date of Patent: Aug. 27, 2024

(54) ATTACHMENT OF A WIRELESS DEVICE TO A MOBILE NETWORK OPERATOR

(71) Applicant: Telefonaktiebolaget LM Ericsson (publ), Stockholm (SE)

(72) Inventors: Maria Esther Bas Sanchez, Madrid (ES); David Castellanos Zamora, Madrid (ES); Peter Hedman, Helsingborg (SE); Christine Jost, Lund (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 781 days.

(21) Appl. No.: 16/465,382

(22) PCT Filed: Jan. 26, 2017

(86) PCT No.: PCT/EP2017/051668
§ 371 (c)(1),
(2) Date: May 30, 2019

(87) PCT Pub. No.: WO2018/137769
PCT Pub. Date: Aug. 2, 2018

(65) Prior Publication Data
US 2020/0008052 A1    Jan. 2, 2020

(51) Int. Cl.
*H04W 12/30* (2021.01)
*H04W 8/20* (2009.01)
*H04W 12/06* (2021.01)
*H04W 60/04* (2009.01)

(52) U.S. Cl.
CPC .......... *H04W 12/35* (2021.01); *H04W 8/205* (2013.01); *H04W 12/06* (2013.01); *H04W 60/04* (2013.01)

(58) Field of Classification Search
CPC ..... H04W 12/35; H04W 8/205; H04W 12/06; H04W 60/04; H04W 4/35; H04W 60/00
See application file for complete search history.

(56) References Cited

U.S. PATENT DOCUMENTS

| | | | |
|---|---|---|---|
| 8,407,769 B2 * | 3/2013 | Salmela | H04W 4/00 726/6 |
| 9,137,656 B2 * | 9/2015 | O'Leary | H04W 12/04 |
| 9,774,581 B2 * | 9/2017 | Leicher | H04L 63/08 |
| 10,439,823 B2 * | 10/2019 | Park | H04L 63/0823 |

(Continued)

FOREIGN PATENT DOCUMENTS

EP    3 057 350 A1    8/2016

OTHER PUBLICATIONS

International Search Report and Written Opinion of the International Searching Authority for International Application No. PCT/EP2017/051668 dated Apr. 7, 2017.

(Continued)

*Primary Examiner* — Ali S Abyaneh
*Assistant Examiner* — Lydia L Noel
(74) *Attorney, Agent, or Firm* — Sage Patent Group

(57) ABSTRACT

There is provided mechanisms for attachment of a wireless device to an MNO. A method is performed by the wireless device. The method comprises providing an authorization token to an AMF node of the MNO in conjunction with authenticating with the AMF node. The method comprises completing attachment to the MNO upon successful validation of the authorization token by the AMF node.

15 Claims, 4 Drawing Sheets

(56) References Cited

U.S. PATENT DOCUMENTS

| | | | |
|---|---|---|---|
| 2011/0016321 A1 | 1/2011 | Sundaram et al. | |
| 2013/0305330 A1* | 11/2013 | Palanigounder | H04L 63/0876 726/6 |
| 2015/0281966 A1* | 10/2015 | Griot | H04W 12/35 726/5 |
| 2016/0205550 A1* | 7/2016 | Rajadurai | H04W 8/082 455/411 |
| 2017/0359749 A1* | 12/2017 | Dao | H04L 47/2416 |
| 2018/0007557 A1* | 1/2018 | Lee | H04L 67/12 |
| 2018/0376384 A1* | 12/2018 | Youn | H04W 36/0022 |

OTHER PUBLICATIONS

Huawei et al., "Secure Mechanism to Achieve Remote Credential Provisioning for IoT devices," S3-161000, 3GPP TSG SA WG3 (Security) Meeting #84, Jul. 25-29, 2016, Chennai, India, 4 pages.
GSM Association Official Document SGP.01, "Embedded SIM Remote Provisioning Architecture, Version 1.1," Jan. 30, 2014, 85 pages.
GSM Association Official Document SGP.21, "RSP Architecture, Version 1.0," Dec. 23, 2015, 52 pages.

* cited by examiner

ATTACHMENT OF A WIRELESS DEVICE TO A MOBILE NETWORK OPERATOR

CROSS REFERENCE TO RELATED APPLICATION

This application is a 35 U.S.C. § 371 national stage application of PCT International Application No. PCT/EP2017/051668, filed on Jan. 26, 2017, the disclosure of which is hereby incorporated herein by reference in its entirety.

TECHNICAL FIELD

Embodiments presented herein relate to methods, a wireless device, an access and mobility management function node, computer programs, and a computer program product for attachment of the wireless device to a mobile network operator.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

The GSM Association (GSMA), where GSM is short for Global System for Mobile communications, has released an architecture approach denoted "SGP.01 Embedded UICC Remote Provisioning Architecture V1.1" defining a mechanism for over the air remote provisioning of machine-to-machine (M2M) devices with the necessary credentials to gain mobile network access, under the assumption that the same or similar authentication protocols as today will be used. GSMA has further released a technical specification denoted "SGP.02 V3.1 Remote Provisioning Architecture for embedded UICC" which targets machine-to-machine (M2M) type communications devices.

GSMA has further released an architecture approach denoted "SGP.21 RSP Architecture" version 2.0 and a technical specification denoted "SGP.22-RSP Technical Specification" Version 2.0 defining remote subscriber identification module (SIM) provisioning for consumer devices. In short, the operator uses an entity called SM-DP+/SM-DP (short for Subscription Management-Data Preparation) for creation of SIM profiles that are later installed from the SM-DP/SM-DP+ to the eUICC. For the consumer devices, the SIM profile is installed through a Local Profile Assistant (LPA) on the consumer device to the Issuer Security Domain Profile (ISD-P) on the eUICC in the device. For the M2M devices, the SM-DP installs the SIM profile via a separate (external) entity, SM-SR, to the ISD-P on the device.

For M2M devices, the above disclosed mechanisms for remote Sim provisioning permit service providers, acting as owners of the device, to decide the mobile network operator (MNO) giving network access to their devices and not restricting the devices to be tied to one specific MNO forever by providing a method to download an MNO operational profile each time the MNO is changed. But for the first time the device downloads an operational profile, the device needs a provisioning profile that needs to be stored in the device at manufacture time. This means that the above disclosed mechanisms for remote SIM provisioning need initial network connectivity to a provisioning server in order to perform remote provisioning.

If the network access used for profile provisioning is using a cellular telecommunications network, the device needs a provisioning subscription including credentials that allow the device to authenticate and be authenticated by the cellular telecommunications network and to be authorized to access to it. The associated provisioning profile has to be stored in the device at manufacture time, and populated in the network of the MNO. Alternatively, the initial connectivity can also be provided e.g. by access to a wireless local area network (WLAN) or via a companion device.

Solution #12.3 in document 3GPP TR 33.899 solves the mutual authentication issue by using the (e.g. eUICC/device) certificates as credentials for access authentication. These credentials are not tied to any subscription in any MNO so they can be stored in the device at manufacture time. But still, even if an MNO could allow execution of mutual authentication using these alternative UE credentials, the device should still not obtain full connectivity to the network.

Hence, there is still a need for improved mechanisms for attachment of a device to an MNO.

SUMMARY

An object of embodiments herein is to provide efficient attachment of a wireless device to an MNO.

According to a first aspect there is presented a method for attachment of a wireless device to an MNO. The method is performed by the wireless device. The method comprises providing an authorization token to an access and mobility management function (AMF) node of the MNO in conjunction with authenticating with the AMF node. The method comprises completing attachment to the MNO upon successful validation of the authorization token by the AMF node.

According to a second aspect there is presented a wireless device for attachment to an MNO. The wireless device comprises processing circuitry. The processing circuitry is configured to cause the wireless device to provide an authorization token to an AMF node of the MNO in conjunction with authenticating with the AMF node. The processing circuitry is configured to cause the wireless device to complete attachment to the MNO upon successful validation of the authorization token by the AMF node.

According to a third aspect there is presented a wireless device for attachment to an MNO. The wireless device comprises processing circuitry and a storage medium. The storage medium stores instructions that, when executed by the processing circuitry, cause the wireless device to perform operations, or steps. The operations, or steps, cause the wireless device to provide an authorization token to an AMF node of the MNO in conjunction with authenticating with the AMF node. The operations, or steps, cause the wireless device to complete attachment to the MNO upon successful validation of the authorization token by the AMF node.

According to a fourth aspect there is presented a wireless device for attachment to an MNO. The wireless device comprises a provide module configured to provide an authorization token to an AMF node of the MNO in conjunction with authenticating with the AMF node. The wireless device comprises an attach module configured to complete attachment to the MNO upon successful validation of the authorization token by the AMF node.

According to a fifth aspect there is presented a computer program for attachment of a wireless device to an MNO, the computer program comprises computer program code which, when run on processing circuitry of the wireless device, causes the wireless device to perform a method according to the first aspect.

According to a sixth aspect there is presented a method for attachment of a wireless device to an MNO. The method is performed by an AMF node of the MNO. The method comprises obtaining an authorization token from the wireless device in conjunction with the wireless device authenticating with the AMF node. The method comprises validating the authorization token in order to verify access authorization of the wireless device. The method comprises allowing the wireless device to complete attachment to the MNO upon successful validation of the authorization token.

According to a seventh aspect there is presented an AMF node for attachment of a wireless device to an MNO. The AMF node comprises processing circuitry. The processing circuitry is configured to cause the AMF node to obtain an authorization token from the wireless device in conjunction with the wireless device authenticating with the AMF node. The processing circuitry is configured to cause the AMF node to validate the authorization token in order to verify access authorization of the wireless device. The processing circuitry is configured to cause the AMF node to allow the wireless device to complete attachment to the MNO upon successful validation of the authorization token.

According to an eighth aspect there is presented an AMF node for attachment of a wireless device to an MNO. The AMF node comprises processing circuitry and a storage medium. The storage medium stores instructions that, when executed by the processing circuitry, cause the AMF node to perform operations, or steps. The operations, or steps, cause the AMF node to obtain an authorization token from the wireless device in conjunction with the wireless device authenticating with the AMF node. The operations, or steps, cause the AMF node to validate the authorization token in order to verify access authorization of the wireless device. The operations, or steps, cause the AMF node to allow the wireless device to complete attachment to the MNO upon successful validation of the authorization token.

According to a ninth aspect there is presented an AMF node for attachment of a wireless device to an MNO. The AMF node comprises an obtain module configured to obtain an authorization token from the wireless device in conjunction with the wireless device authenticating with the AMF node. The AMF node comprises a validate module configured to validate the authorization token in order to verify access authorization of the wireless device. The AMF node comprises an attach module configured to allow the wireless device to complete attachment to the MNO upon successful validation of the authorization token.

According to a tenth aspect there is presented a computer program for attachment of a wireless device to an MNO, the computer program comprising computer program code which, when run on processing circuitry of an AMF node, causes the AMF node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these wireless devices, these AMF nodes, and these computer programs provide efficient attachment of the wireless device to the MNO Advantageously these methods, these wireless devices, these AMF nodes, and these computer programs allow that the network of the MNO to not need to be populated with individual subscriptions for wireless devices that are only needed for remote SIM provisioning of the wireless devices. That is, the MNO does not need even to know, before attaching, the identity of the wireless devices to be authorized for the purpose e.g. of remote provisioning of subscription credentials.

Advantageously these methods, these wireless devices, these AMF nodes, and these computer programs remove the need for storage of authorization profiles for individual wireless devices.

Advantageously these methods, these wireless devices, these AMF nodes, and these computer programs remove the need for a business agreement between the service provider and the MNO to be in place at manufacturing of the wireless device.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
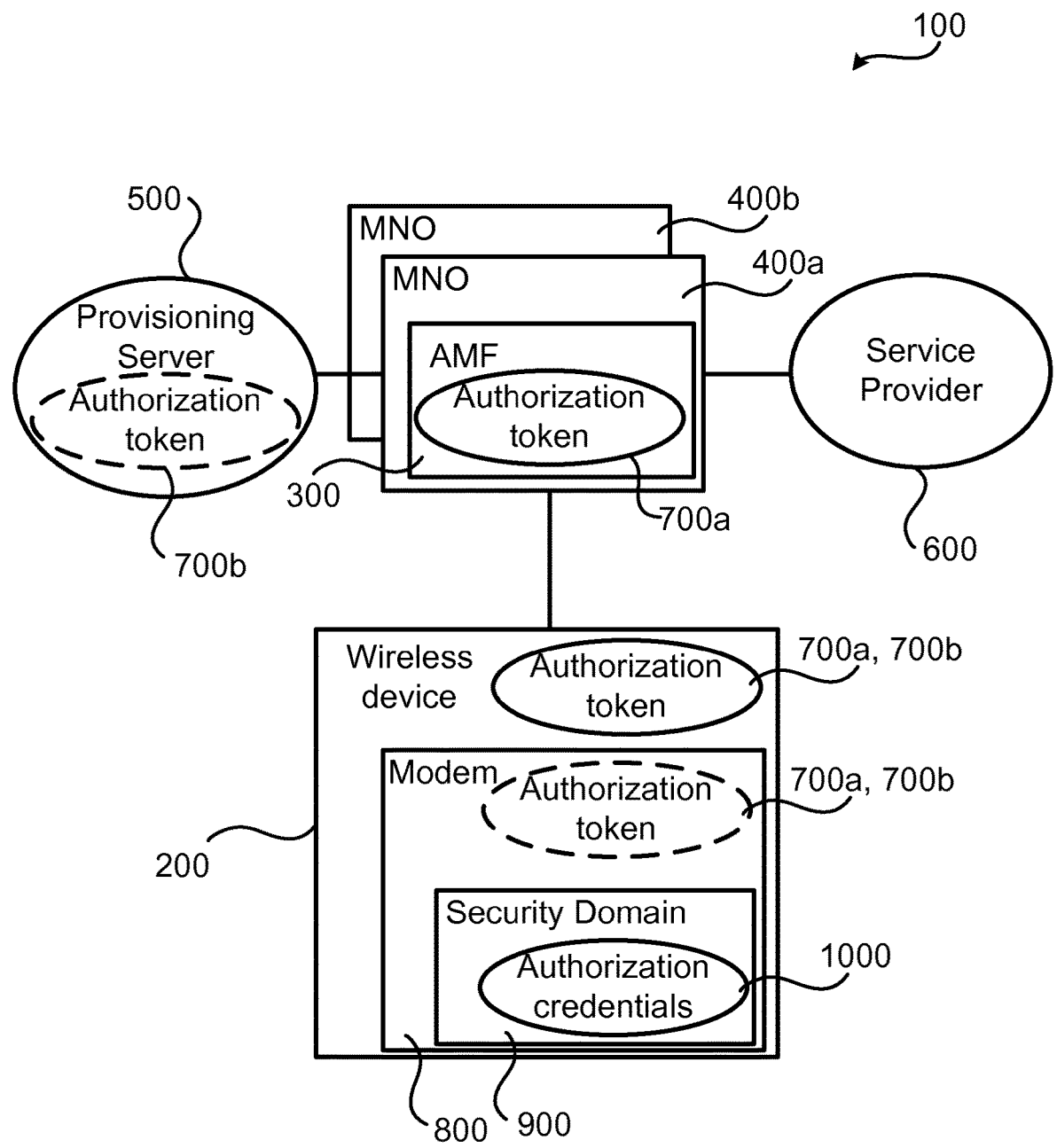
FIG. 1 is a schematic diagram illustrating a communications system according to embodiments.

FIG. 1 is a schematic diagram illustrating a communications system 100 where embodiments presented herein can be applied. The communications system 100 comprises a wireless device 200, an AMF node 300, at least one MNO 400a, 400b, a provisioning server 500, and a service provider 600.

There are different examples of wireless devices 200. Examples of wireless devices 200 include, but are not limited to, portable wireless devices, mobile stations, mobile phones, handsets, wireless local loop phones, user equipment (UE), smartphones, laptop computers, tablet computers, wireless modems, wireless sensor device, consumer devices, and M2M devices. The wireless device 200 could be controlled by the service provider 600. The wireless device 200 comprises a modem 800 having a security domain 900. The security domain 900 stores authentication credentials. The authentication credentials are needed for the wireless device 200 to access the network of the MNO 400a for provisioning purposes. The wireless device 200 is populated with at least one authorization token 700a, 700b. The authorization token 700a, 700b could be provided from the wireless device 200 to either the AMF node 300 or the provisioning server 500, depending on the type of authorization token. The authorization token 700a, 700b could be stored in a storage medium 230 of the wireless device 200 (see below). Further details of the authorization token 700a, 700b and how the authorization token 700a, 700b may be used will be disclosed below. The authorization token 700a, 700b does not need to be stored in the security domain 900 but can be stored inside the modem 800 (so that the modem manufacturer needs to store it and personalize it for the service provider 600) or outside the modem 800 avoiding that the modem manufacturing is tailored for a particular service provider 600.

The service provider 600 could, but not necessarily, be regarded as the owner of the wireless device 200. The service provider 600 has an agreement with the MNO 400a for the wireless device 200 to obtain provisioning access (and possibly also operational access) for at a given country/location where the wireless device 200 is to be used and/or activated. The service provider 600 does not need to have an agreement with the provisioning server 500.

The MNO 400a, 400b is the network operator that gives network access to the wireless device 200 for provisioning, and typically also for operation. In more detail, in some aspects MNOa gives network access for the wireless device 200 for accessing the provisioning server 500 and optionally access to operational access, whereas MNOb only gives network access for operational access. The MNO 400a, 400b has an agreement with the service provider 600, or owner, of the wireless device 200 for such a purpose. The MNO 400a, 400b further has an agreement with the provisioning server 500 for download of an operational profile to the wireless device 200 to. The MNO 400a, 400b controls the choice of the provisioning server 500.

The provisioning server 500 stores the operational profile and enables the actual download of the operational profile to wireless device 200.

The embodiments disclosed herein thus relate to mechanisms for attachment of the wireless device 200 to an MNO 400a. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided an AMF node 300, a method performed by the AMF node 300, and a computer program product comprising code, for example in the form of a computer program, that when run on processing circuitry of the AMF node 300, causes the AMF node 300 to perform the method.

Figure 2:
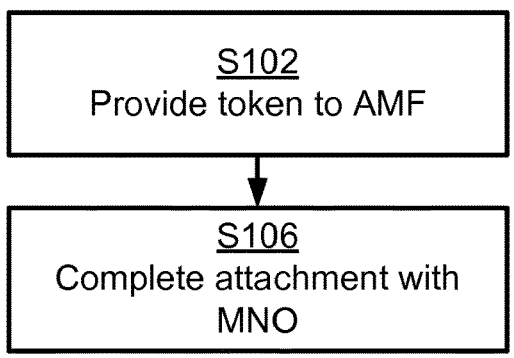
FIGS. 2, 3, 4, and 5 are flowcharts of methods according to embodiments.
Figure 4:
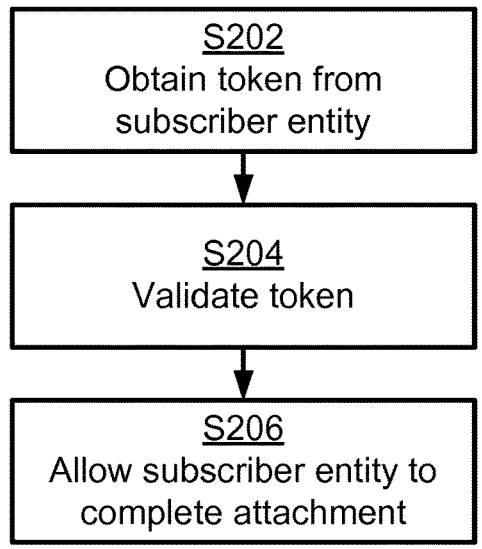
Figure 3:
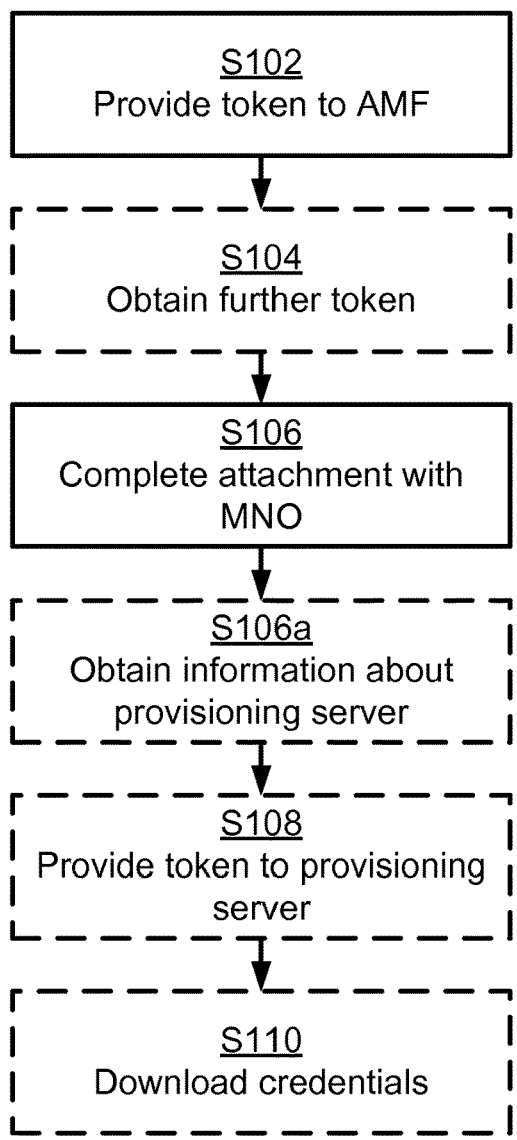
Figure 5:
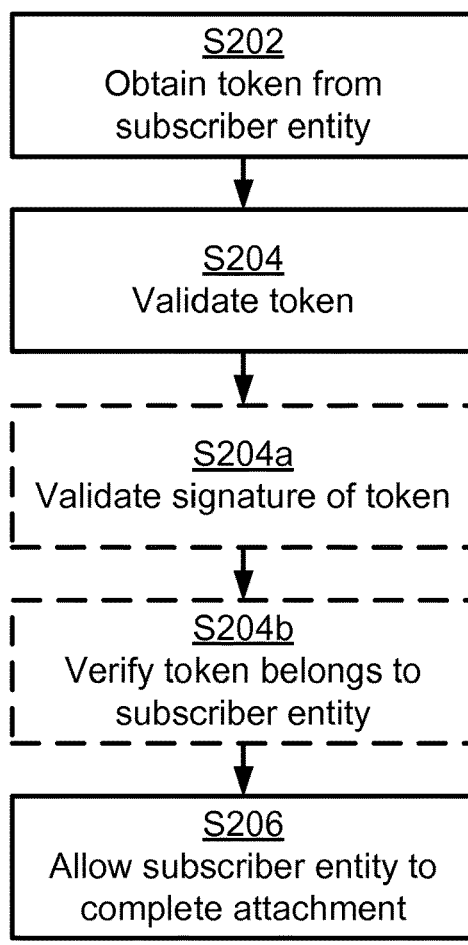
Figure 6:
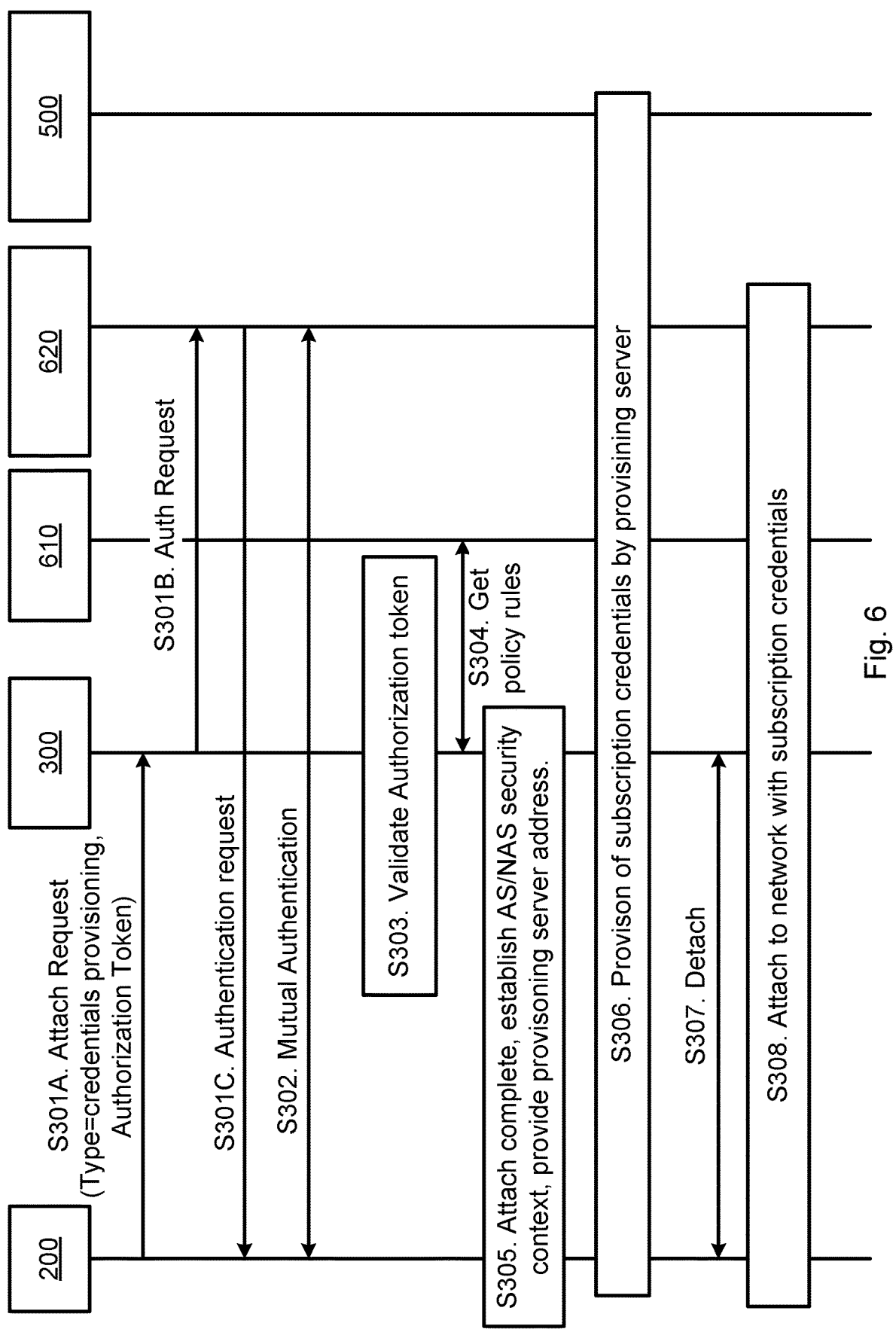
FIG. 6 is a signalling diagram according to an embodiment.

FIGS. 2 and 3 are flow charts illustrating embodiments of methods for attachment of the wireless device 200 to an MNO 400a as performed by the wireless device 200. FIGS. 4 and 5 are flow charts illustrating embodiments of methods for attachment of the wireless device 200 to an MNO 400a as performed by the AMF node 300. The methods are advantageously provided as computer programs 1120a, 1120b.

Reference is now made to FIG. 2 illustrating a method for attachment of the wireless device 200 to an MNO 400a as performed by the wireless device 200 according to an embodiment.

For authorization purposes, the wireless device 200 is only allowed to get initial connectivity to be further provisioned remotely upon presenting a valid authorization token 700a. Hence, the wireless device 200 is configured to perform step S102:

S102: The wireless device 200 provides an authorization token 700a to the AMF node 300 of the MNO 400a in conjunction with authenticating with the AMF node 300.

This enables the wireless device 200 to be authorized without having any subscription credentials to access the MNO 400a to download operational subscription credentials without using any individual provisioning subscriptions. Hence, the wireless device 200 is configured to perform step S106:

S106: The wireless device 200 completes attachment to the MNO 400a upon successful validation of the authorization token 700a by the AMF node 300.

A wireless device 200 without network subscription can thereby use a cellular telecommunications network to access a service authorized by a service provider 600 e.g. to access to the provisioning server 500 to download operational subscription credentials. This is accomplished by the AMF node 300 authorizing the access to such service based on the authorization token 700a. An MNO 400a with a proper business agreement with the service provider 600 will be able to validate the authorization token 700a and enable access in its network to the wireless device 200 for the authorized services.

Embodiments relating to further details of attachment of the wireless device 200 to an MNO 400a as performed by the wireless device 200 will now be disclosed.

Aspects of the authorization token 700a will now be disclosed.

In general terms, the authorization token 700a asserts that the service provider 600 controls the authenticated wireless device 200.

According to an embodiment the authorization token 700a comprises information identifying a service provider 600 having a service license agreement with the MNO 400a and information identifying the wireless device 200.

In some aspects the authorization token 700a indicates which type of service is requested. Hence, according to an embodiment the authorization token 700a comprises information identifying which service the wireless device 200 is authorized for (by use of the authorization token 700a).

In some aspects the service relates to access for remote provisioning of the wireless device 200. Hence, according to an embodiment the service involves the wireless device 200 to access to the MNO 400a only for download of operational subscription credentials. However, the use of the authorization token 700a may enable the wireless device 200 to access also other kinds of services, e.g. access to basic data services over the Internet.

According to an embodiment the authorization token 700a is signed by a service provider 600 of the MNO 400a. The authorization token 700a could be signed by the private key of the service provider 600.

A possible structure of the authorization token 700a might thus be as follows:

Authorization Token=[SPid, Authorized (WD) id, Authorized service]SPprk

Here, SPid denotes information identifying the service provider 600, Authorized (WD) id denotes information identifying the wireless device 200, Authorized service denotes information identifying which service the wireless device 200 is authorized for, and SPprk denotes that the authorization token is signed with the private key of the service provider 600.

There could be different possibilities for the wireless device 200 to provide the authorization token 700a to the AMF node 300 in step S102, as well as different messages in which the authorization token 700a could be provided. In an embodiment the authorization token 700a is provided in an attach request message. In another embodiment the authorization token 700a is provided in a registration request message. In another embodiment the authorization token 700a is provided during authentication signalling. In the latter embodiment the authentication signalling will be between the wireless device 200 and an Authentication Credential Repository and Processing Function (ARPF) or Authentication Server Function (AUSF) node via the AMF node 300 whereby the AMF node 300 intercepts the authorization token 700a during authentication signalling.

Reference is now made to FIG. 3 illustrating methods for attachment of the wireless device 200 to an MNO 400a as performed by the wireless device 200 according to further embodiments. It is assumed that steps S102, S106 are performed as described above with reference to FIG. 2 and a thus repeated description thereof is therefore omitted.

There may be different ways for the wireless device 200 to complete the attachment to the MNO 400a in step S106a. According to some aspects the AMF node 300 provides information to the wireless device 200 about the provisioning server 500. Hence, according to an embodiment the wireless device 200 is configured step S106a as part of step S106:

S106a: The wireless device 200 obtains information about a provisioning server 500 from the AMF node 300, from which provisioning server 500 operational subscription credentials are downloadable to the wireless device 200.

The provisioning server 500 may belong to, or have a service agreement with, the MNO 400a or to another MNO 400b. In the latter case the MNO 400b is the operational MNO, that is, the MNO handling the operational subscription credentials to be downloaded. In this case it is MNO 400b that has a service license agreement with the provisioning server 600 for download of operational subscription credentials, whereas MNO 400a is only used for giving initial network access to the wireless device 200.

The thus far principles of using an authorization token 700a for MNO access could also be used for the wireless device 200 to access the provisioning server 500. Embodiments relating thereto will now be disclosed.

In some aspects the further authorization token 700b is provided by the MNO 400a in the initial attach response (or registration accept). Hence, according to an embodiment the wireless device 200 is configured step S104:

S104: The wireless device 200 obtains a further authorization token 700b in conjunction with authenticating with the AMF node 300 (for example as part of an attachment procedure or registration procedure).

This further authorization token 700b is used for the wireless device 200 to access the provisioning server 500. In general terms, for authorization for download of the operational profile from the provisioning server 500, the wireless device 200 uses the further authorization token 700b. The further authorization token 700b could be included in a profile download request as the base for the authorization of the profile download. Particularly, according to an embodiment the wireless device 200 is configured steps S108 and S110:

S108: The wireless device 200 provides the further authorization token 700b to the provisioning server 500 of the MNO 400a, from which provisioning server 500 operational subscription credentials are downloadable to the wireless device 200.

S110: The wireless device 200 downloads the operational subscription credentials upon successful validation of the further authorization token 700b by the provisioning server 500.

A provisioning server 500 with a proper business agreement with the MNO 400a will be able to validate the further authorization token 700n and build, bind, and enable download of the corresponding profile as defined by the operational subscription credentials.

Aspects of the further authorization token 700b will now be disclosed.

In general terms, the further authorization token 700b asserts that the MNO 400a controls the authenticated wireless device 200.

According to an embodiment the authorization token 700a comprises information identifying the MNO 400a and information identifying the wireless device 200.

In some aspects the further authorization token 700b indicates which type of service is requested. Hence, according to an embodiment the further authorization token 700b comprises information identifying which service the wireless device 200 is authorized for (by use of the further authorization token 700b).

In some aspects the service relates to download of certain type of profile to the wireless device 200. Hence, according to an embodiment the service defines which type of network operational profile the wireless device 200 is authorized to download from the provisioning server 500.

According to an embodiment the further authorization token 700b is signed by the MNO 400a.

The further authorization token 700b could thereby authorize a specific wireless device 200 with a specific identity to access a specific provisioning server 500 to download of a profile.

A possible structure of the further authorization token 700b might thus be as follows:

Authorization Token=[MNOid, Authorized (WD) id, Authorized service]MNOprk

Here, MNOid denotes information identifying the MNO 400*a*, Authorized (WD) id denotes information identifying the wireless device 200, Authorized service denotes information identifying which service the wireless device 200 is authorized for, and MNOprk denotes that the authorization token is signed with the private key of the MNO 400*a*.

Reference is now made to FIG. 4 illustrating a method for attachment of the wireless device 200 to an MNO 400*a* as performed by the AMF node 300 of the MNO 400*a* according to an embodiment.

As disclosed above, the wireless device 200 in step S102 provides the authorization token 700*a* to the AMF node 300. Hence, the AMF node 300 is configured to perform step S202:

S202: The AMF node 300 obtains an authorization token 700*a* from the wireless device 200 in conjunction with the wireless device 200 authenticating with the AMF node 300.

The authorization token 700*a* is then validated by the AMF node 300. Hence, the AMF node 300 is configured to perform step S204:

S204: The AMF node 300 validates the authorization token 700*a* in order to verify access authorization of the wireless device 200.

The wireless device 200 is allowed to complete attachment to the MNO 400*a* only when the verification is successful. Hence, the AMF node 300 is configured to perform step S206:

S206: The AMF node 300 allows the wireless device 200 to complete attachment to the MNO 400*a* upon successful validation of the authorization token 700*a*.

Embodiments relating to further details of attachment of the wireless device 200 to an MNO 400*a* as performed by the AMF node 300 will now be disclosed.

Reference is now made to FIG. 5 illustrating methods for attachment of the wireless device 200 to an MNO 400*a* as performed by the AMF node 300 according to further embodiments. It is assumed that steps S202, S204, S206 are performed as described above with reference to FIG. 4 and a thus repeated description thereof is therefore omitted.

As disclosed above, according to an embodiment the authorization token 700*a* comprises information identifying a service provider 600 of the MNO 400*a* and the wireless device 200, or the MNO 400*a* and the security domain 900 contained in the wireless device 200, and the authorization token 700*a* is signed by the service provider 600. According to some aspects the MNO 400*a* of the AMF node 300 has a service agreement with the service provider 600. Particularly, according to an embodiment the MNO 400*a* of the AMF node 300 has a service agreement with this service provider 600.

According to some aspects the AMF node 300 has access to the public key of the service provider 600 and uses this public key in order to validate the signature of the service provider 600. Access to the public key could be achieved by an encryption certificate being sent to the AMF node 300. Hence, according to an embodiment the AMF node 300 is configured to perform step S204*a* as part of validating the authorization token 700*a* in step S204:

S204*a*: The AMF node 300 validates, using the public key, that the authorization token 700*a* is signed by the service provider 600.

In some aspects the identity in the authorization token 700*a* needs to be the same as the authenticated identity (i.e., the identity of the wireless device 200). However these identities could be different from each other. In this case, both identities need to have a relation known by the AMF node 300. Hence, according to an embodiment the AMF node 300 is configured to perform step S204*a* as part of validating the authorization token 700*a* in step S204*b*:

S204*b*: The AMF node 300 verifies that the wireless device 200 from which the authorization token 700*a* was obtained is identical to wireless device 200 identified by the information in the authorization token 700*a*, or is known by the AMF node 300 to contain the security domain 900 identified by information in the authorization token 700*a*.

One particular embodiment for attachment of the wireless device 200 to an MNO 400*a* based on at least some of the above disclosed embodiments will now be disclosed in detail.

S301A, 301B, S301C: The wireless device 200 sends an attach request (or Registration request) message to the AMF node, which triggers an authentication procedure between the AUSF/ARPF 620 and the wireless device 200.

The attach request (or Registration request) includes an authorization token 700*a* which the AMF node 300 stores for validation in step S303 after authentication of the wireless device 200. As an alternative, the address of the server of the authorized service could be provided by the wireless device 200 inside the authorization token 700*a* or outside the authorization token 700*a*.

Alternatively, the authentication token is conveyed to the AMF node 300 within authentication signaling (e.g. within Extensible Authentication Protocol (EAP) message exchange via the AUSF) during step S302.

S302: The AUSF/ARPF 620 authenticates the wireless device 200 using provisioning credentials. The authentication process may also involve communication between the AUSF/ARPF 620 an external entity, e.g., a certificate authority or a third party authentication server.

S303: After successful authentication of the wireless device 200, the AMF node 300 performs access authorization. For that, the AMF node 300 makes use of the received authorization token 700*a*. The authorization token 700*a* is signed by the service provider 600. An MNO 400*a* with a proper business relation (e.g., by means of a valid service license agreement) with the service provider 600 will have the public key of the service provider 600 and will be able to validate the signature of the authorization token 700*a*. The authorization token 700*a* includes as well the identity of the wireless device 200 to be authorized. If this identity is the same as the one authenticated in step S302, then access can be authorized and the AMF node 300 continues with the process. If the authorization token 700*a* can not be validated, the AMF node 300 rejects the attach request (or registration request).

As a variant, the identity of the wireless device 200 as given by the authorization token 700*a* may be different from the identity authenticated in step S302 for the access to be authorized. In this case the authorization of this combination of identities must be confirmed by some other means. It could be part of the authorization token 700*a* or of the information available to the AMF node 300 due to the business agreement between the MNO 400*a* and the service provider 600.

The MNO 400*a* will manage a service provider profile where the terms of the business agreement with the service provider 600 can be referred to. The service provider profile could comprise information such as services authorized for the wireless device 200 and other operational information for the delivery of the authorized services. For example, the operation information may include the address of the provisioning server 500 that the wireless device 500 is to contact to be provisioned with valid subscription credentials.

S304: After authentication and authorization, the AMF node 300 requests a protocol data unit (PDU) session for delivery of the authorized service. The AMF node 300 installs the policy rules related to the traffic flows the wireless device 200 will be authorized to establish at the Next Generation radio User Plane Function (NG-UPF; not illustrated) and provides the Quality of service (QoS) rules, including packet filters, to the wireless device 200. This ensures that the wireless device 200 only uses the connection for the purpose of access to the authorized service (e.g., the remote provisioning of subscription credentials); packet filters ensures that the wireless device 200 will not send packets beyond what is allowed and the NG-UPF enforces the packet filters. The policy rules can, for example, be requested from a policy control node 610. The authorized traffic flows could, for example, restrict traffic from the IP address assigned to the wireless device 200 towards the IP address of the provisioning server 500. The address of the authorized service within the data network (e.g. the address of the provisioning server 500) could be fetched by the policy control node 610 from the service provider profile kept by the MNO 400a, transferred from the AMF node 300 to the policy control node 610 via, or by, the AMF node 300.

S305: The AMF node 300 completes the attach request (or registration request) and establishes security contexts. The AMF node 300 may provide information to the wireless device 200 relating to e.g. the address of the server of the authorized service (e.g., the provisioning server 500) that the wireless device 200 is allowed to connect to according to the service provider authorization profile and policy rules. The information could further comprise a reference to the subscription if the MNO 400a refers to a particular subscription or subscription type previously agreed with the provisioning server 500. If mechanisms specified in above mentioned "SGP.22-RSP Technical Specification Version 1.1 CR 1003" are used, this information is specified in the so-called Activation Code that comprises the following parameters: SM-DP+ address, Activation Code Token and SMDPid (optional) identifying the SM-DP+ of the provisioning server 500.

S306: The provisioning process between the wireless device 200 and the provisioning server 500 takes place using User Plane signaling.

S307: After successful provisioning of the subscription credentials, the wireless device 200 detaches from the network. Alternatively, the detachment is enforced by the network due to the policy rules, e.g., after a certain time.

A308: The wireless device 200 uses its subscription credentials to attach to the network for general access.

Figure 7:
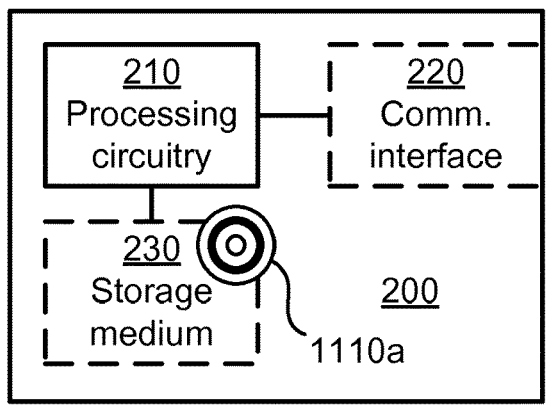
FIG. 7 is a schematic diagram showing functional units of a wireless device according to an embodiment.

FIG. 7 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 111 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-S110, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with other entities and devices in the communications system 100. As such the communications interface 220 may comprise one or more transmitters and receivers, comprising analogue and digital components.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 8:
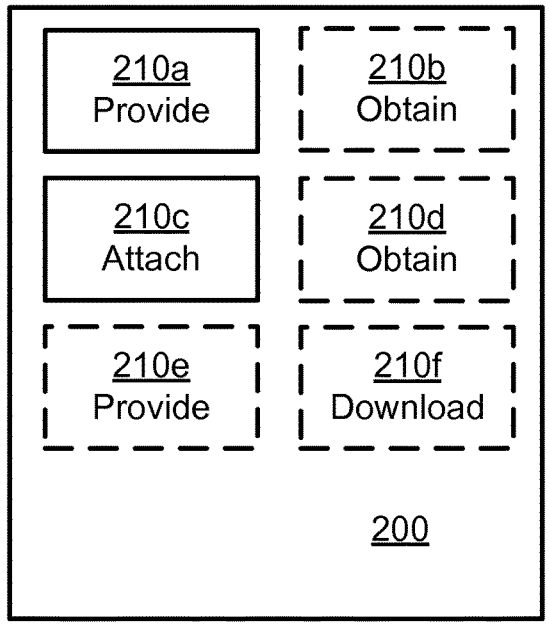
FIG. 8 is a schematic diagram showing functional modules of a wireless device according to an embodiment.

FIG. 8 schematically illustrates, in terms of a number of functional modules, the components of a wireless device 200 according to an embodiment. The wireless device 200 of FIG. 8 comprises a number of functional modules; a provide module 210a configured to perform step S102, and an attach module 210c configured to perform step S106. The wireless device 200 of FIG. 8 may further comprise a number of optional functional modules, such as any of an obtain module 210b configured to perform step S104, an obtain module 210d configured to perform step S106a, a provide module 210e configured to perform step S108, and a download module 210f configured to perform step S110. In general terms, each functional module 210a-210f may be implemented in hardware or in software. Preferably, one or more or all functional modules 210a-210f may be implemented by the processing circuitry 210, possibly in cooperation with the communications interface 220 and the storage medium 230. The processing circuitry 210 may thus be arranged to from the storage medium 230 fetch instructions as provided by a functional module 210a-210f and to execute these instructions, thereby performing any steps of the wireless device 200 as disclosed herein.

Figure 9:
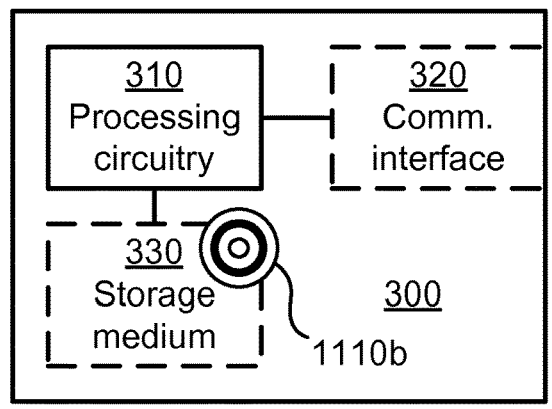
FIG. 9 is a schematic diagram showing functional units of an AMF node according to an embodiment.

FIG. 9 schematically illustrates, in terms of a number of functional units, the components of an AMF node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the AMF node 300 to perform a set of operations, or steps, S202-S206, as disclosed above. For example, the storage medium 330 may store the set of operations, and the processing circuitry 310 may be configured to retrieve the set of operations from the storage medium 330 to cause the AMF node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The AMF node 300 may further comprise a communications interface 320 for communications with other entities and devices in the communications system 100. As such the communications interface 320 may comprise one or more transmitters and receivers, comprising analogue and digital components.

The processing circuitry 310 controls the general operation of the AMF node 300 e.g. by sending data and control signals to the communications interface 320 and the storage medium 330, by receiving data and reports from the communications interface 320, and by retrieving data and instructions from the storage medium 330. Other components, as well as the related functionality, of the AMF node 300 are omitted in order not to obscure the concepts presented herein.

Figure 10:
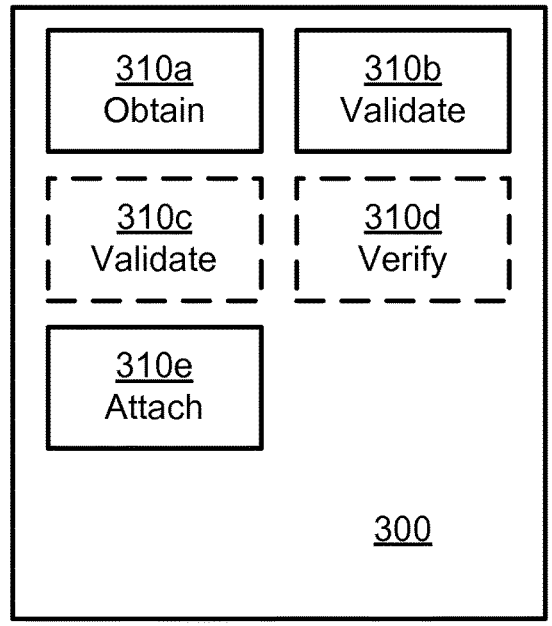
FIG. 10 is a schematic diagram showing functional modules of an AMF node according to an embodiment.

FIG. 10 schematically illustrates, in terms of a number of functional modules, the components of an AMF node 300 according to an embodiment. The AMF node 300 of FIG. 10 comprises a number of functional modules; an obtain module 310a configured to perform step S202, a validate module 310b configured to perform step S204, and an attach module 310e configured to perform step S206. The AMF node 300 of FIG. 10 may further comprise a number of optional functional modules, such as any of a validate module 310c configured to perform step S204a, and a verify module 310d configured to perform step S204b. In general terms, each functional module 310a-310e may be implemented in hardware or in software. Preferably, one or more or all functional modules 310a-310e may be implemented by the processing circuitry 310, possibly in cooperation with the communications interface 320 and the storage medium 330. The processing circuitry 310 may thus be arranged to from the storage medium 330 fetch instructions as provided by a functional module 310a-310e and to execute these instructions, thereby performing any steps of the AMF node 300 as disclosed herein.

The AMF node 300 may be provided as a standalone device or as a part of at least one further device. For example, the AMF node 300 may be provided in a node of a core network. Alternatively, functionality of the AMF node 300 may be distributed between at least two devices, or nodes. These at least two nodes, or devices, may either be part of the same network part or may be spread between at least two such network parts. Thus, a first portion of the instructions performed by the AMF node 300 may be executed in a first device, and a second portion of the of the instructions performed by the AMF node 300 may be executed in a second device; the herein disclosed embodiments are not limited to any particular number of devices on which the instructions performed by the AMF node 300 may be executed. Hence, the methods according to the herein disclosed embodiments are suitable to be performed by a AMF node 300 residing in a cloud computational environment. Therefore, although a single processing circuitry 310 is illustrated in FIG. 9 the processing circuitry 310 may be distributed among a plurality of devices, or nodes. The same applies to the functional modules 310a-310e of FIG. 10 and the computer program 1120b of FIG. 11 (see below).

Figure 11:
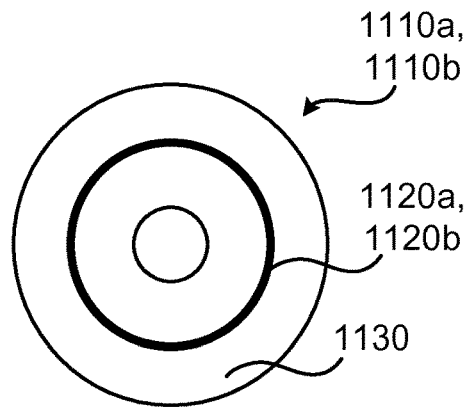
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the wireless device 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the AMF node 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for attachment of a wireless device to a mobile network operator, MNO, the method being performed by the wireless device, the method comprising:
   providing an authorization token to an access and mobility management function (AMF) node of the MNO in conjunction with authenticating with the AMF node,
   wherein the authorization token comprises information identifying which service the wireless device is authorized for and information identifying a service provider having a service license agreement with the MNO,
   wherein the authorization token is provided during authentication signalling,
   wherein the authorization token is signed by the service provider, and
   wherein after authentication and authorization, the AMF node installs policy rules related to traffic flows and packet filters to the wireless device, so as to ensure that the wireless device only uses a connection for a purpose of accessing to the authorized service, and to ensure that the wireless device does not send packets beyond what is allowed;
   completing attachment to the MNO upon successful validation of the authorization token by the AMF node,
   wherein completing attachment to the MNO comprises obtaining information about a provisioning server from the AMF node, from which provisioning server operational subscription credentials are downloadable to the wireless device, and wherein a provisioning process between the wireless device and the provisioning server takes place using User Plane signaling;
obtaining a further authorization token in conjunction with authenticating with the AMF node;
providing the further authorization token to the provisioning server, from which the operational subscription credentials are downloadable to the wireless device; and
downloading the operational subscription credentials upon successful validation of the further authorization token by the provisioning server.

2. The method according to claim 1, wherein the authorization token comprises information identifying the wireless device.

3. The method according to claim 1, wherein the service involves the wireless device to access to the MNO only for download of operational subscription credentials.

4. The method according to claim 1, wherein the authorization token is provided in an attach request message or a registration request message.

5. The method according to claim 1, wherein the further authorization token comprises information identifying the MNO and the wireless device.

6. The method according to claim 1, wherein the further authorization token comprises information identifying which service the wireless device is authorized for.

7. The method according to claim 6, wherein the service defines which type of network operational profile the wireless device is authorized to download from the provisioning server.

8. The method according to claim 1, wherein the further authorization token is signed by the MNO.

9. A method for attachment of a wireless device to a mobile network operator, MNO, the method being performed by an access and mobility management function (AMF) node of the MNO, the method comprising:
obtaining an authorization token from the wireless device in conjunction with the wireless device authenticating with the AMF node,
wherein the authorization token comprises information identifying which service the wireless device is authorized for and information identifying a service provider having a service license agreement with the MNO,
wherein the authorization token is obtained during authentication signalling, and
wherein the authorization token is signed by the service provider;
validating the authorization token in order to verify access authorization of the wireless device;
responsive to authentication and authorization, installing policy rules related to traffic flows and packet filters to the wireless device, so as to ensure that the wireless device only uses a connection for a purpose of accessing to the authorized service, and to ensure that the wireless device does not send packets beyond what is allowed;
allowing the wireless device to complete attachment to the MNO upon successful validation of the authorization token;
providing information to the wireless device about a provisioning server from which provisioning server operational subscription credentials are downloadable to the wireless device,
wherein a provisioning process between the wireless device and the provisioning server takes place using User Plane signaling;
obtaining a further authorization token in conjunction with authenticating with the AMF node;
providing the further authorization token to the provisioning server, from which the operational subscription credentials are downloadable to the wireless device; and
downloading the operational subscription credentials upon successful validation of the further authorization token by the provisioning server.

10. The method according to claim 9, wherein the AMF node has access to a public key of the service provider, and wherein validating the authorization token comprises:
validating, using the public key, that the authorization token is signed by the service provider.

11. The method according to claim 9, wherein validating the authorization token comprises:
verifying that the wireless device from which the authorization token was obtained is identical to the wireless device identified by the information in the authorization token, or is known by the AMF node to contain a security domain identified by information in the authorization token.

12. A wireless device for attachment to a mobile network operator, MNO, the wireless device comprising:
processing circuitry; and
a storage medium storing instructions that, when executed by the processing circuitry, cause the wireless device to perform operations comprising:
providing an authorization token to an access and mobility management function (AMF) node of the MNO in conjunction with authenticating with the AMF node,
wherein the authorization token comprises information identifying which service the wireless device is authorized for and information identifying a service provider having a service license agreement with the MNO,
wherein the authorization token is provided during authentication signalling,
wherein the authorization token is signed by the service provider, and
wherein after authentication and authorization, the AMF node installs policy rules related to traffic flows and packet filters to the wireless device, so as to ensure that the wireless device only uses a connection for a purpose of accessing to the authorized service, and to ensure that the wireless device does not send packets beyond what is allowed;
completing attachment to the MNO upon successful validation of the authorization token by the AMF node,
wherein completing attachment to the MNO comprises obtaining information about a provisioning server from the AMF node, from which provisioning server operational subscription credentials are downloadable to the wireless device, and
wherein a provisioning process between the wireless device and the provisioning server takes place using User Plane signaling;
obtaining a further authorization token in conjunction with authenticating with the AMF node;
providing the further authorization token to the provisioning server, from which the operational subscription credentials are downloadable to the wireless device; and downloading the operational subscription credentials upon successful validation of the further authorization token by the provisioning server.

13. An access and mobility management function (AMF) node for attachment of a wireless device to a mobile network operator, MNO, the AMF node comprising:
    processing circuitry; and
    a storage medium storing instructions that, when executed by the processing circuitry, cause the AMF node to perform operations comprising:
        obtaining an authorization token from the wireless device in conjunction with the wireless device authenticating with the AMF node,
            wherein the authorization token comprises information identifying which service the wireless device is authorized for and information identifying a service provider having a service license agreement with the MNO,
            wherein the authorization token is obtained during authentication signalling, and
            wherein the authorization token is signed by the service provider;
        validating the authorization token in order to verify access authorization of the wireless device;
        responsive to authentication and authorization, installing policy rules related to traffic flows and packet filters to the wireless device, so as to ensure that the wireless device only uses a connection for a purpose of accessing to the authorized service, and to ensure that the wireless device does not send packets beyond what is allowed;
        allowing the wireless device to complete attachment to the MNO upon successful validation of the authorization token;
        providing information to the wireless device about a provisioning server from which provisioning server operational subscription credentials are downloadable to the wireless device,
            wherein a provisioning process between the wireless device and the provisioning server takes place using User Plane signaling;
        obtaining a further authorization token in conjunction with authenticating with the AMF node;
        providing the further authorization token to the provisioning server, from which the operational subscription credentials are downloadable to the wireless device; and
        downloading the operational subscription credentials upon successful validation of the further authorization token by the provisioning server.

14. A computer program product for attachment of a wireless device to a mobile network operator, MNO, the computer program product comprising a non-transitory computer readable medium storing computer code which, when run on processing circuitry of the wireless device, causes the wireless device to perform operations comprising:
    providing an authorization token to an access and mobility management function (AMF) node of the MNO in conjunction with authenticating with the AMF node,
        wherein the authorization token comprises information identifying which service the wireless device is authorized for and information identifying a service provider having a service license agreement with the MNO,
        wherein the authorization token is provided during authentication signalling,
        wherein the authorization token is signed by the service provider, and
        wherein after authentication and authorization, the AMF node installs policy rules related to traffic flows and packet filters to the wireless device, so as to ensure that the wireless device only uses a connection for a purpose of accessing to the authorized service, and to ensure that the wireless device does not send packets beyond what is allowed;
    completing attachment to the MNO upon successful validation of the authorization token by the AMF node,
        wherein completing attachment to the MNO comprises obtaining information about a provisioning server from the AMF node, from which provisioning server operational subscription credentials are downloadable to the wireless device, and
        wherein a provisioning process between the wireless device and the provisioning server takes place using User Plane signaling;
    obtaining a further authorization token in conjunction with authenticating with the AMF node;
    providing the further authorization token to the provisioning server, from which the operational subscription credentials are downloadable to the wireless device; and
    downloading the operational subscription credentials upon successful validation of the further authorization token by the provisioning server.

15. A computer program product for attachment of a wireless device to a mobile network operator, MNO, the computer program product comprising a non-transitory computer readable medium storing computer code which, when run on processing circuitry of an access and mobility management function (AMF) node, causes the AMF node to perform operations comprising:
    obtaining an authorization token from the wireless device in conjunction with the wireless device authenticating with the AMF node,
        wherein the authorization token comprises information identifying which service the wireless device is authorized for and information identifying a service provider having a service license agreement with the MNO,
        wherein the authorization token is obtained during authentication signalling, and
        wherein the authorization token is signed by the service provider;
    validating the authorization token in order to verify access authorization of the wireless device;
    responsive to authentication and authorization, installing policy rules related to traffic flows and packet filters to the wireless device, so as to ensure that the wireless device only uses a connection for a purpose of accessing to the authorized service, and to ensure that the wireless device does not send packets beyond what is allowed;
    allowing the wireless device to complete attachment to the MNO upon successful validation of the authorization token;
    providing information to the wireless device about a provisioning server from which provisioning server operational subscription credentials are downloadable to the wireless device,
        wherein a provisioning process between the wireless device and the provisioning server takes place using User Plane signaling;
    obtaining a further authorization token in conjunction with authenticating with the AMF node;

providing the further authorization token to the provisioning server, from which the operational subscription credentials are downloadable to the wireless device; and downloading the operational subscription credentials upon successful validation of the further authorization token by the provisioning server.

\* \* \* \* \*